UNITED STATES PATENT OFFICE.

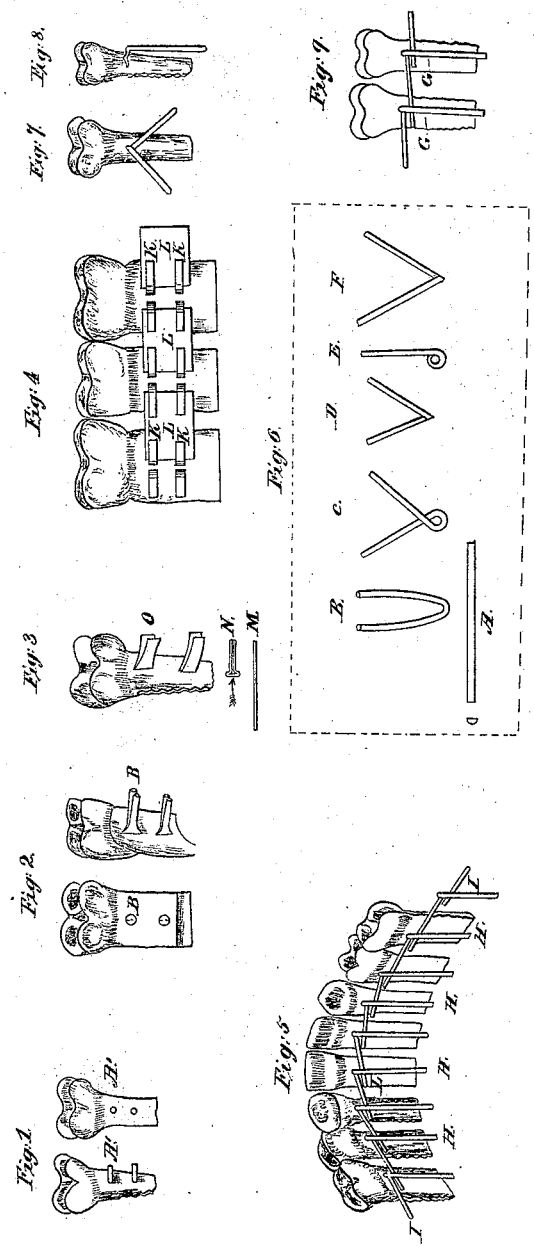
J. Hassell, Jr.
Pin for Artificial Teeth.
No. 24,209.    Patented May 31, 1859.

JOHN HASSEL, JR., OF NEWARK, NEW JERSEY.

CONSTRUCTION OF PINS FOR SECURING ARTIFICIAL TEETH.

Specification of Letters Patent No. 24,209, dated May 31, 1859.

*To all whom it may concern:*

Be it known that I, JOHN HASSELL, Jr., of the city of Newark, county of Essex, State of New Jersey, have invented a new and useful Improvement in the Mode of Securing Artificial Teeth to the Plate; and I do hereby declare that the following is a full and exact description thereof, reference being had to the annexed drawings and to the letters of reference marked therein.

The nature of my invention consists in providing an artificial tooth, previous to its being baked, with a split pin double or single, made of half-round or flattened wire, introduced into the tooth, by means of which, I am enabled to fold the split ends back upon separate pieces of platina, or other metal, placed alternately between the teeth on the inside surface, in the one case, and to fold back the end of the split pin under the preceding pin, which form a strong basket work or skeleton lining, while in the first instance I form a strong continuous arch.

To enable others skilled in the art to make and use my invention I will proceed to describe its construction and operation.

Figure 1, represents a common artificial tooth enlarged with solid pins A. Fig. 2 represents a single gum tooth with the double split pin B. Fig. 3 represents a tooth with the double flat split pin O. Fig. 4 represents a series of teeth with the double flat split pin attached. Fig. 5 represents a series of teeth with the double half round split pin applied showing a skeleton lining. Fig. 6 represents the mode of converting the wire to be used into the various shapes and positions preparatory to forming a perfect pin, half round as B, or flat as K Fig. 4. Fig. 7 represents a tooth with the newly prepared double split pin attached, which is the mode to be adopted for the skeleton lining as Fig. 5. Fig. 8 represents an edge view in section of Fig. 7. Fig. 9 represents two teeth, showing the manner of connecting together the ends of the split pin so as to form a continuous skeleton lining.

I commence my operations by using a piece of half-round wire represented at A (Fig. 6) then double it as at B. Continue to bend it until it assumes the shape at C. I then twist the eye as at D. half way around, now turn down the eye at right angles with the ends as at E. It is now ready for use, and will assume the position shown at F. with the ends open, now place the above described pin in an artificial tooth previously prepared, and bake the whole together in the usual way, after which it will assume the condition shown at Figs. 7 and 8. The advantage of this split pin over the ordinary short solid pin as shown at A' Fig. 1. is, that I am enabled to form a skeleton lining, without separate pieces of platina. This object is effected in the following manner. By taking any number of teeth with the split pin attached as shown at Figs. 7 and 8, and so adjust the ends of the pins that one will assume a horizontal, and the other a vertical position as shown at Fig. 9. I now place them in the plaster, properly arranged, and insert the horizontal end of one pin, under the perpendicular end of the preceding pin of the other tooth as shown at G Fig. 9 and thus continue this loop arrangement until the entire set of teeth is connected together as shown at I, I, I, Fig. 5. Now rub the whole down to the teeth, also the lower end of the pins as at H, H, H, Fig. 5, which are left sufficiently long, so as to touch the lower plate upon which all the above described pins soldered, this rubbing process also to be continued through the entire set of teeth, forming a complete basket work or skeleton lining. This will make stronger work and with any other kind of pin and offers greater facilities to correct your articulation.

The term articulation in dentistry, signifies the manner of properly adjusting the newly-inserted teeth in the mouth of the patient so as to correspond and match the old teeth already in.

The above-described split pin I also use in another manner, by leaving the end much shorter as shown at B' B, Fig. 2. I apply it to single gum teeth, in the same manner as the ordinary solid pin Fig. 1, with this advantage, it may be folded back, upon separate pieces of platina placed alternately between each tooth as shown at L Fig. 4, which constitutes a perfect and solid continuous arch, when more than one tooth is used. These may be made in the ordinary molds, by drilling the holes a little deeper in the molds.

Another modification of this split pin, is the flat design, as shown at Figs. 3, and 4. I can use either one or two flat pins as the case requires, or the judgment of the artist decides. I take a flat piece of platina as M, Fig. 3, and bend it into the shape as at N, leaving a small projection or head on it as the arrow. Now insert this flat split pin in the tooth and bake it in the usual way, after which it will assume the condition as shown at O, Fig. 3. Now arrange these said teeth in the plaster to suit the artist, as at Fig. 4, having previously prepared the separate pieces of platina L, Fig. 2, and place the said pieces of platina L between each tooth and bend over the ends of the split pin to the right and left alternately on to the flat pieces of platina L, as shown at K, after which rub down the whole with a burnisher as before and solder both the pin and plate L, together. These split pins, either half round or flat may be used under all circumstances, for every kind of tooth or number of teeth, either single gum teeth as Fig. 2, or continuous arch work as Fig. 4, or skeleton lining as Fig. 5.

The advantages of my double split pin are, first, they facilitate the setting of teeth which is a great desideratum. Second, the extra strength of the arch both in the skeleton lining and the continuous arch. Third, the facilities they offer to correct the articulation. (See page 5, 17th line.)

What I claim as my invention and desire to secure by Letters Patent, is—

The split pin used double or single, half round or flat for the purposes set forth and substantially as herein described.

JOHN HASSELL, Jr.

Witnesses:
CHAS. B. THURSTON,
E. G. KEARSING.